United States Patent [19]
Henning et al.

[11] Patent Number: 5,947,812
[45] Date of Patent: Sep. 7, 1999

[54] AIR RETURN BULKHEAD FOR REFRIGERATION TRAILERS

[76] Inventors: Steven A. Henning, 5343 S. R. 109 South, Anderson, Ind. 46013; Richard J. Gothier, 3023 E. Dartmouth St., Mesa, Ariz. 85213

[21] Appl. No.: 09/102,060

[22] Filed: Jun. 22, 1998

Related U.S. Application Data

[63] Continuation-in-part of application No. 08/801,214, Feb. 18, 1997, Pat. No. 5,769,704, which is a continuation-in-part of application No. 08/701,215, Aug. 21, 1996, abandoned.

[51] Int. Cl.$^6$ .................................................... B60H 1/32
[52] U.S. Cl. ............................... 454/118; 62/407; 62/413; 454/91
[58] Field of Search .................................. 454/88, 90, 91, 454/118; 62/239, 329, 406, 407, 413, 414

[56] References Cited

U.S. PATENT DOCUMENTS

| | | | |
|---|---|---|---|
| 1,071,449 | 8/1913 | McAfee | 62/413 |
| 4,143,588 | 3/1979 | Exier | 454/118 |
| 4,399,737 | 8/1983 | Severson | 62/239 X |
| 4,495,857 | 1/1985 | Morgan . | |
| 5,678,421 | 10/1997 | Maynard et al. | 62/407 |
| 5,807,046 | 9/1998 | Onken | 62/239 X |

OTHER PUBLICATIONS

"Carrier Bulkhead", Aero Industries Brochure, 1993.
"Air Chutes", Aero Industries Brochure, 1993.
"Lattice Bulkhead", Aero Industries Brochure, 1993.
"Solid Bulkhead", Aero Industries Brochure, 1993.
"Installation of Solid Bulkheads", Aero Industries Brochure, 1993.
"Pallet Stops", Aero Industries Brochure, 1993.
"Thermo King SB III Bulkheads", Aero Industries Brochure, 1993.
"Thermo King Super II Bulkheads", Aero Industries Brochure, 1993.
"Better Air Flow–Better Temp Control", F/G Products, Inc., Jan. 1992.

*Primary Examiner*—Harold Joyce

[57] ABSTRACT

An air return baffle for refrigeration trailers is characterized by a unitary panel molded from synthetic plastic material and containing integral baffles for improving air movement to the refrigeration unit of the trailer. The panel is adapted for mounting in sealed relation adjacent the front wall of the trailer and at least partially covers the refrigeration unit. The lower portion of the panel contains a plurality of openings for drawing air into the cavity defined behind the panel. Air is directed by the baffles toward the refrigeration unit, and the air movement eliminates hot and cold spots within the trailer. Vents in the panel are operable should the openings become clogged and a strap is provided to removably connect the panel with the trailer wall. Wings on the upper wall of the panel direct air from the cavity to openings in the side portions of the refrigeration unit.

19 Claims, 10 Drawing Sheets

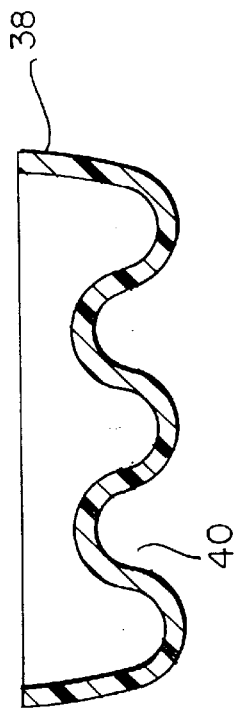
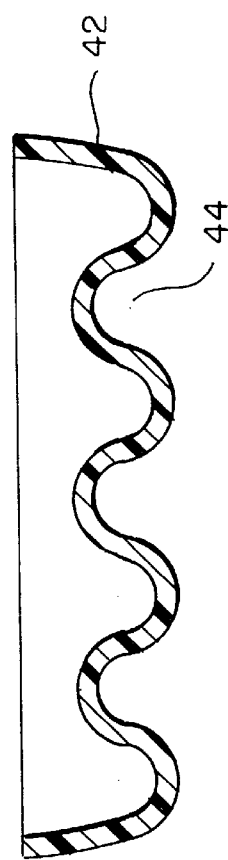
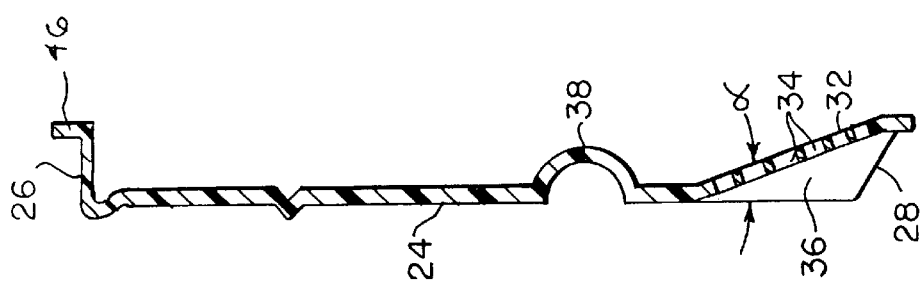

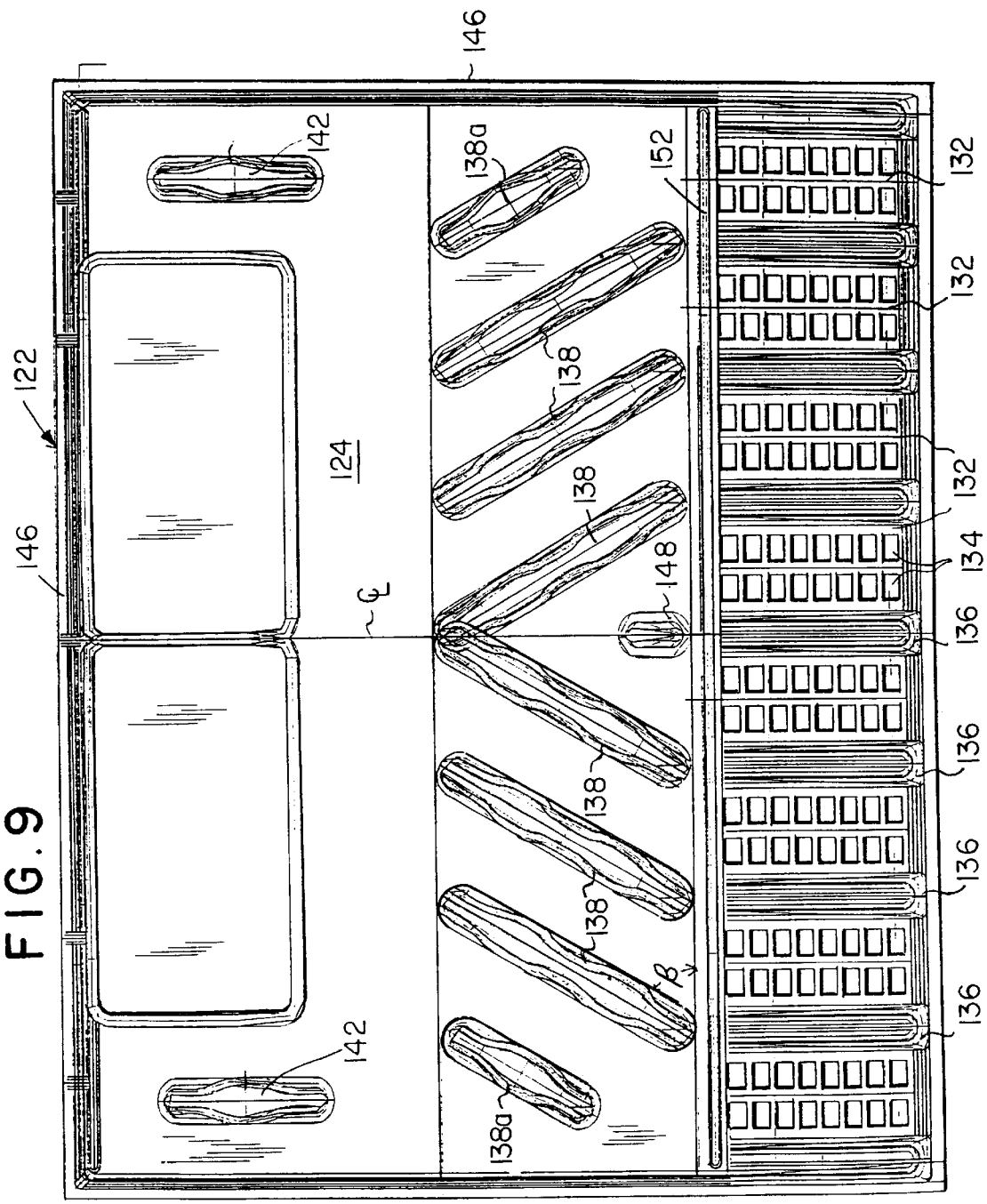

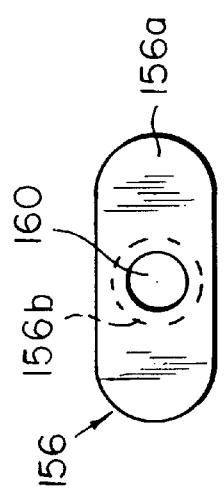
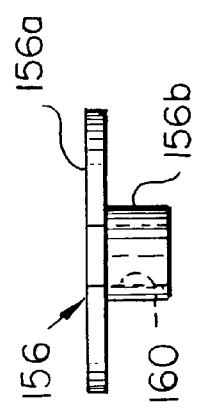
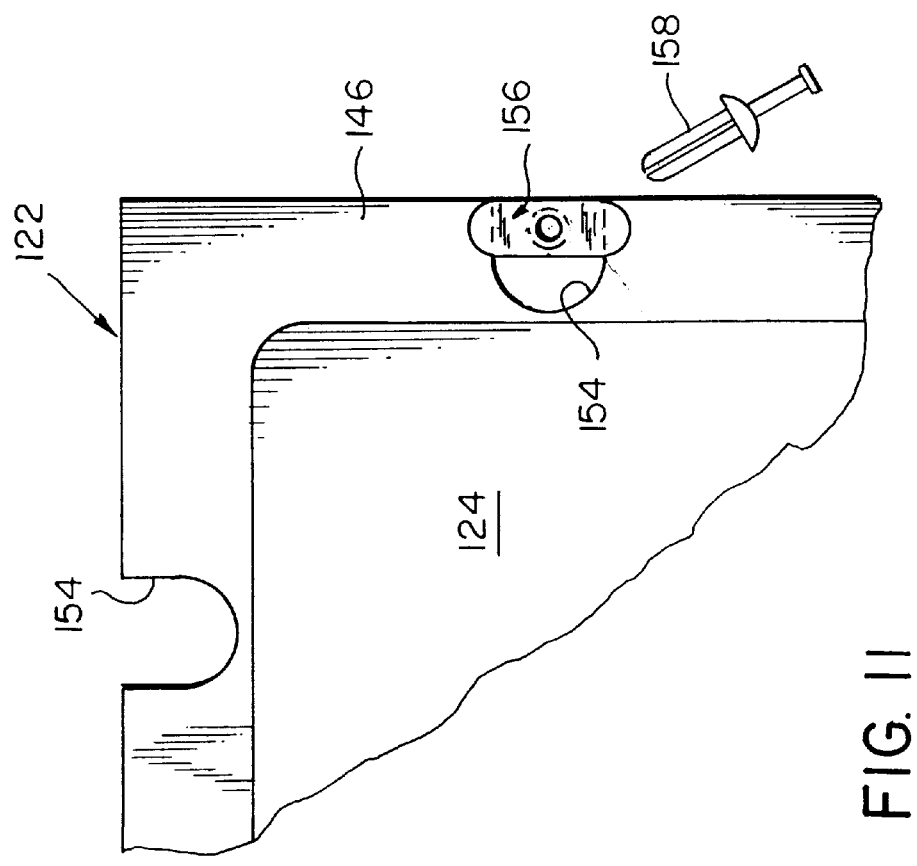

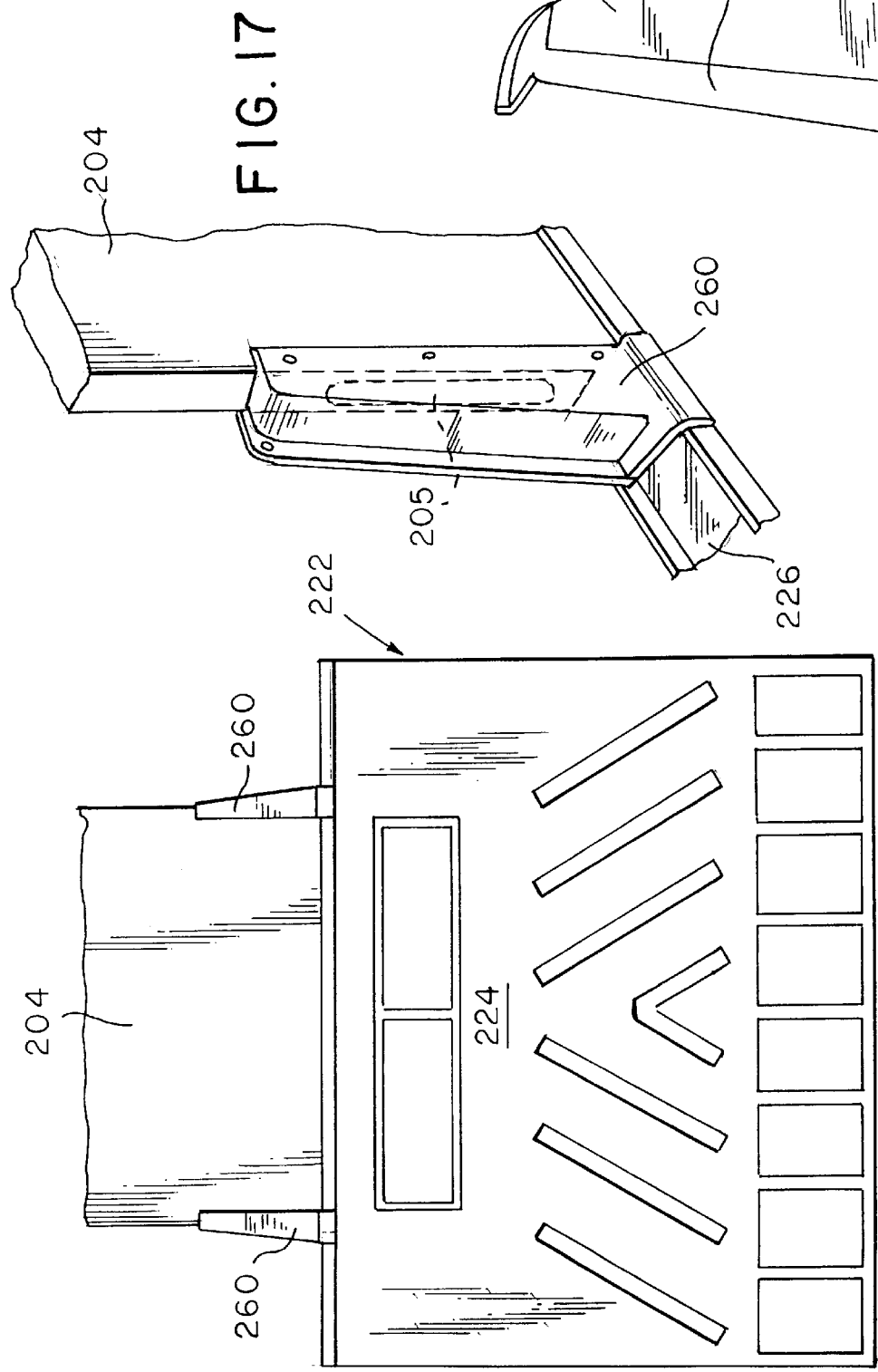

AIR RETURN BULKHEAD FOR REFRIGERATION TRAILERS

This application is a continuation-in-part of application Ser. No. 08/801,214, filed Feb. 18, 1997, now U.S. Pat. No. 5,769,704, which is a continuation-in-part of application Ser. No. 08/701,215, filed Aug. 21, 1996, now abandoned.

BACKGROUND OF THE INVENTION

A refrigeration bulkhead is a passive device mounted on the inside front wall of a refrigeration trailer. It generally covers the width of the front wall and has a height either halfway up or fully covering the front wall, thereby covering all or part of a refrigeration unit generally mounted at the upper center portion of the wall. The bulkhead serves two functions. First, it creates a space between the trailer load and the trailer front wall. This space is used to facilitate air movement from the floor of the trailer up the front wall to the refrigeration unit. Through its air intake, the refrigeration unit can remove heat from the air and exhaust the heat to the outside of the trailer. Second, the bulkhead protects the refrigeration unit from fork lifts or other loading devices and their loads.

BRIEF DESCRIPTION OF THE PRIOR ART

Refrigeration trailer bulkheads are well known. The earliest bulkhead was a wooden pallet arranged on end to protect the refrigeration unit while still providing air flow. The temporary pallet was then replaced with a more permanent and aesthetically pleasing lattice work assembly of aluminum uprights and crossmembers. While these prior bulkheads afforded protection to the refrigeration unit, they did not provide directional air flow throughout the trailer resulting in short cycling, i.e., uneven temperature distribution within the trailer.

As the need for directional airflow within the trailer was recognized, solid bulkheads replaced lattice work structures. Essentially, the cross members of the lattice were replaced by solid sheets of plywood, fiberglass reinforced plywood, or thin gauge aluminum. The bulkhead extended between the sides of the trailer and was sealed at the top, with the bottom being left open for a return air intake.

Most recently, molded polyethylene bulkheads have been introduced as solid bulkheads. These are strong enough to resist impact and include several vertically arranged ribs which direct air through the space between the bulkhead and the trailer front wall. At the bottom of each rib is a small triangular shaped opening for air intake. Other air intake holes are located on the side of the vertical ribs. While the prior molded bulkheads are inexpensive, easy to install in a variety of trailers, and stackable, they do not fully overcome the short cycling problem referenced above because they do not provide adequate directional and cross-directional return air flow to the refrigeration unit. Furthermore, they do not accommodate expansion and contraction due to fluctuating temperatures.

SUMMARY OF THE INVENTION

Accordingly, it is a primary object of the invention to provide an air return bulkhead adapted for mounting adjacent a refrigeration unit in spaced relation from a front vertical wall of a refrigeration trailer. The bulkhead includes a rectangular panel molded from synthetic plastic material and including a front wall and side, top, and bottom walls extending normal to the front wall to define a cavity. The front wall includes a plurality of horizontally spaced tapered sections in the lower portion thereof which define a plurality of pallet stops co-planar with the front wall. The tapered sections each contain a plurality of openings which enable air to enter the cavity from the bottom of the trailer. First and second baffles extend into the cavity from the rear of the front wall. The first baffles are arranged above the tapered sections and the second baffles are on opposite sides of the rear upper portion of the front wall. The baffles reinforce the panel and cooperate to direct air upwardly and toward the center of the cavity where the refrigeration unit is arranged.

According to another object of the invention, the bulkhead includes a plurality of bypass vents arranged above the tapered sections to enable air to enter the cavity when the openings in the tapered sections are blocked.

It is a more specific object of the invention to provide a plurality of integral flanges extending from the top, bottom and side walls generally parallel to the front wall. The flanges can be trimmed in order to fit the panel within trailers of different dimensions. An improved strapping mechanism for removably fastening the bulkhead to the trailer wall is also provided.

It is yet another object of the invention to provide a pair of vertically extending spaced wings connected with the top wall of the bulkhead to fit against side portions of the refrigeration unit to deliver air from the cavity to openings in the side portions of the refrigeration unit.

BRIEF DESCRIPTION OF THE FIGURES

Other objects and advantages of the invention will become apparent from a study of the following specification when viewed in the light of the accompanying drawing, in which:

FIGS. 6, 7, and 8 are sectional views taken along lines 6—6, 7—7, and 8—8, respectively of FIG. 4;

FIG. 9 is a front plan view of a preferred embodiment of the air return bulkhead of the invention;

FIG. 11 is a front plan view of the panel flanges illustrating the fastening assembly therefor;

FIGS. 12 and 13 are front and top plan views, respectively, of a washer used for the fastening assembly of FIG. 11;

FIG. 16 is a front plan view of an air return bulkhead including vertically extending wings according to the invention; and FIGS. 17 and 18 are perspective views, respectively, of the wings of FIG. 16.

DETAILED DESCRIPTION

Figure 1:
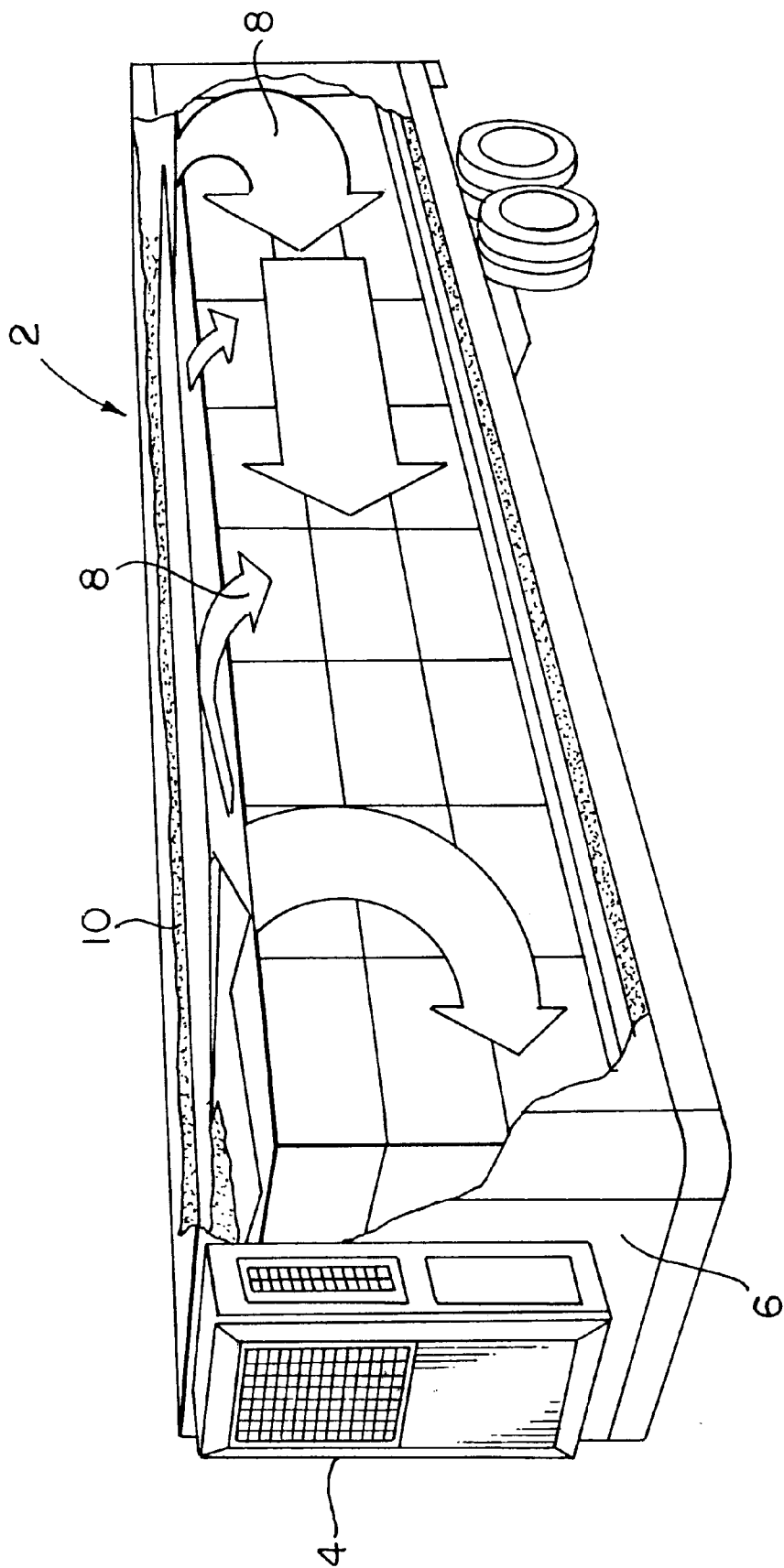
FIG. 1 is a cutaway perspective view of a refrigeration trailer illustrating the optimum air flow therethrough.

The field of the invention will first be described with reference to FIG. 1 wherein a refrigeration trailer 2 is shown.

These trailers are used to transport numerous refrigerated products including ice cream, produce, meat, computers, and dry goods. Accordingly, they include a refrigeration unit 4 which is mounted on the front wall 6 of the trailer toward the top and center thereof The refrigeration unit cools air within the trailer, exhausts heat to the exterior of the trailer, and distributes the cooled air into and through the trailer. As shown by the arrows 8, internal return air ideally is drawn into the refrigeration unit at the bottom front of the trailer and distributed adjacent the top wall 10 of the trailer toward the rear. The cool air falls to the floor at the rear and along the sides of the trailer where it is drawn back to the refrigeration unit.

Figures 2, 3:
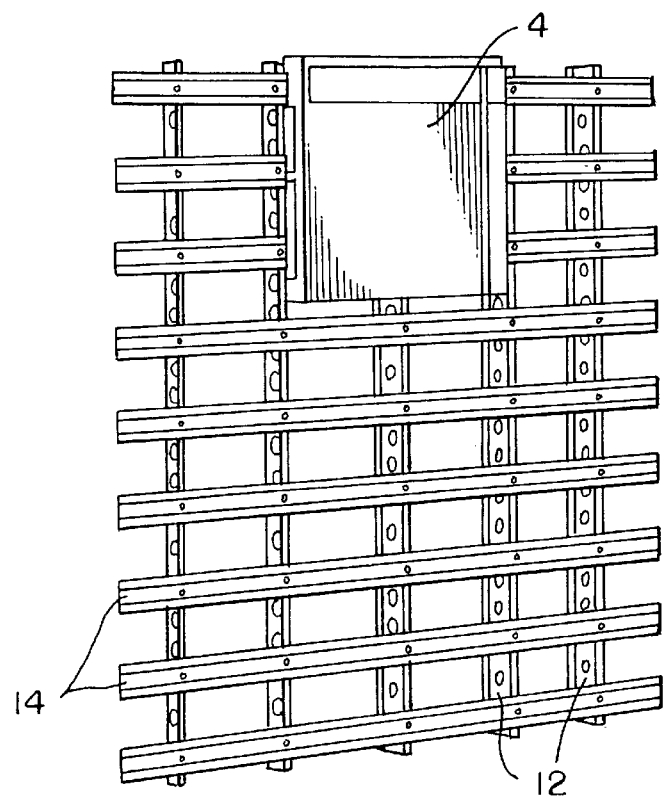
FIGS. 2 and 3 are perspective views, respectively, of refrigeration trailer bulkheads according to the prior art.

In order to protect the refrigeration unit from the load and from forklifts used to load the trailer and to afford air flow to the refrigeration unit, bulkheads were developed for the front wall of the trailer. In FIG. 2, there is shown a lattice work bulkhead comprising vertical aluminum z-bars 12 and aluminum cross bars 14. In addition to being labor intensive to install, lattice type bulkheads do not provide directional return air flow to the refrigeration unit within the trailer resulting in short cycling and hot and cold spots within the trailer rather than a desirable uniform temperature.

In order to improve air flow, a solid bulkhead was developed as shown in FIG. 3. This bulkhead retained the vertical aluminum columns 12 but replaced the cross members with sheets of plywood 16 which in some instances included fiberglass for reinforcement. An apertured screen 18 is arranged along the bottom of the bulkhead and serves as an air inlet. Pallet stops 20 at the bottom of the columns 12 are provided to prevent damage to the bulkhead and the refrigeration unit. Although an improvement over the lattice type bulkheads, the solid fiberglass reinforced plywood bulkhead of FIG. 3 is expensive and heavy making it difficult to install and requiring custom fitting for each size trailer.

Turning now to FIGS. 4–8, the air return bulkhead according to the invention will be described. The bulkhead is essentially a unitary panel 22 which is molded from synthetic plastic material into a generally rectangular configuration. As well be developed below, the panel can be formed with a standard width and height and then trimmed to fit refrigeration units of different configurations. Preferably, the width of the panel is such that the panel extends generally across the width of the trailer front wall. The height of the panel is at least half the height of the front wall and preferably selected so that the panel extends over at least the air return of the refrigeration unit. The panel is adapted for mounting within the trailer adjacent to but spaced from the front wall to define an air return space between the panel and the trailer wall. No support members are required.

The panel 22 includes a front wall 24, a top wall 26, a bottom wall 28, and side walls 30. The top, bottom, and side walls extend in a direction normal to the planar front wall to define a cavity for air flow. Along the bottom, the panel front wall includes a plurality of spaced tapered sections 32. As shown in FIG. 6, the taper extends downwardly and rearwardly at an angle α relative to the plane containing the front wall. The angle α is on the order of 30°. Each tapered section contains a plurality of openings 34 which allow air to be drawn into the cavity. The openings are preferably arranged in rows and columns, with the same number of openings being provided in each section so that air is drawn into the cavity uniformly from across the bottom of the panel. The tapered sections containing the openings further act as a filter to prevent debris from entering the cavity.

Between the tapered sections 32 the remaining portions of the front wall define bumpers or pallet stops 36 against which a pallet bearing a load can be placed within the trailer.

Figure 4:
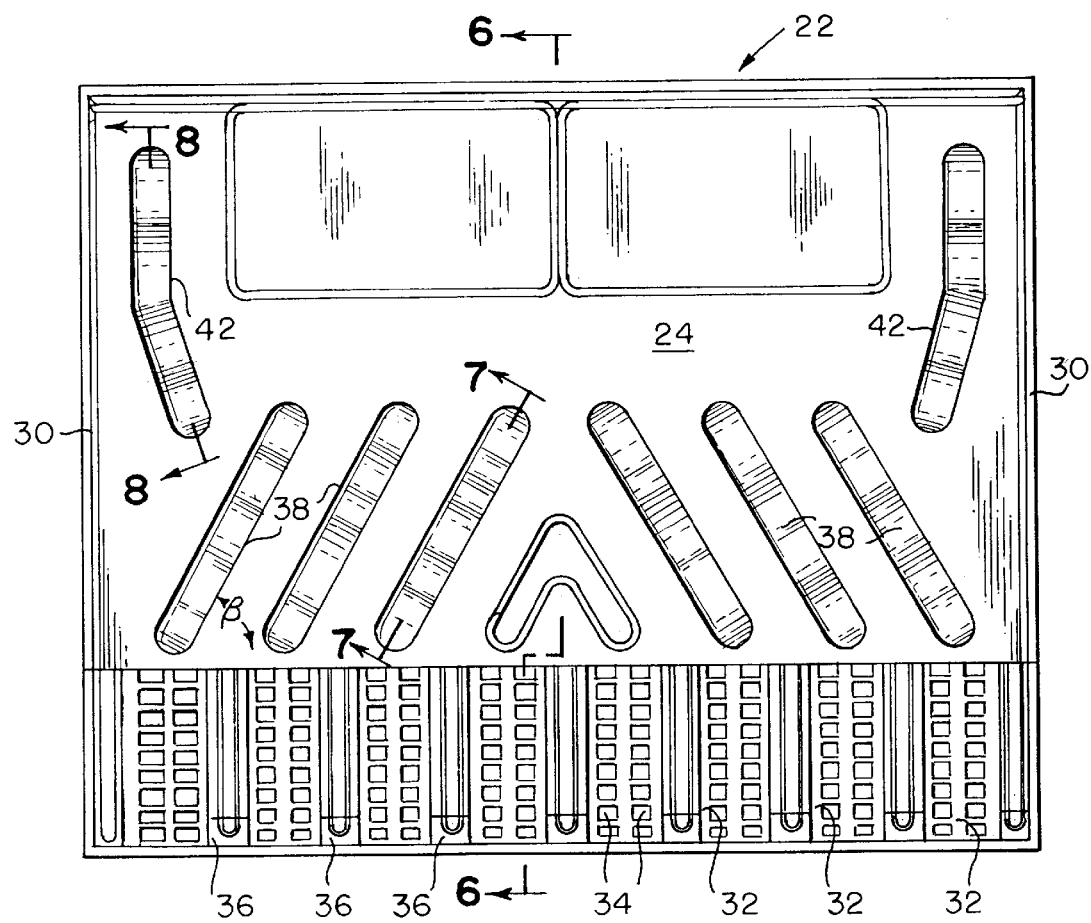
FIGS. 4 and 5 are front plan and perspective views, respectively, of the air return bulkhead according to the invention.

A plurality of first baffles 38 are integrally molded within the panel front wall 24. More particularly, the baffles extend into the cavity from the rear surface of the front wall. Each baffle has a sinusoidal configuration as shown in FIG. 7 to define recesses 40 through which air may pass. As shown in FIG. 4, the first baffles are arranged in two sets on opposite sides of the panel. Each of the baffles extends upwardly toward the vertical centerline at an angle β relative to horizontal. The angle β is preferably 60°.

A pair of second curved baffles 42 are provided adjacent the upper portions of the side walls 30. The second baffles are also integrally molded with the panel and extend from the rear surface thereof with a sinusoidal configuration to define a plurality of recesses 44.

The first baffles 38 direct air from the openings 34 upwardly and toward the center of the panel where the refrigeration unit is located. The second baffles 42 direct air laterally toward the upper central portion of the panel. Thus, the baffles cooperate to circulate air toward the refrigeration unit. The recesses in the baffles afford cross-ventilation and equalize the pressure and air flow within the cavity. These two features improve air movement and result in increased efficiency of the refrigeration unit which receives air from the bulkhead and exhausts warm air to the outside of the trailer and cooled air to the interior of the trailer adjacent the top wall as shown in FIG. 1. Moreover, the sinusoidal configuration of the baffles reinforce the panel since the portions between the recesses can abut against the front wall of the trailer.

The top 26, bottom 28, and side 30 walls of the panel each include a flange 46 extending therefrom in a direction parallel to the front wall. The flange can be trimmed to adapt the panel to differently sized trailers, so that once installed, such as by screwing the panel to the walls of the trailer, a sealed bulkhead is provided, but for the openings 34 along the bottom thereof.

Figure 10:
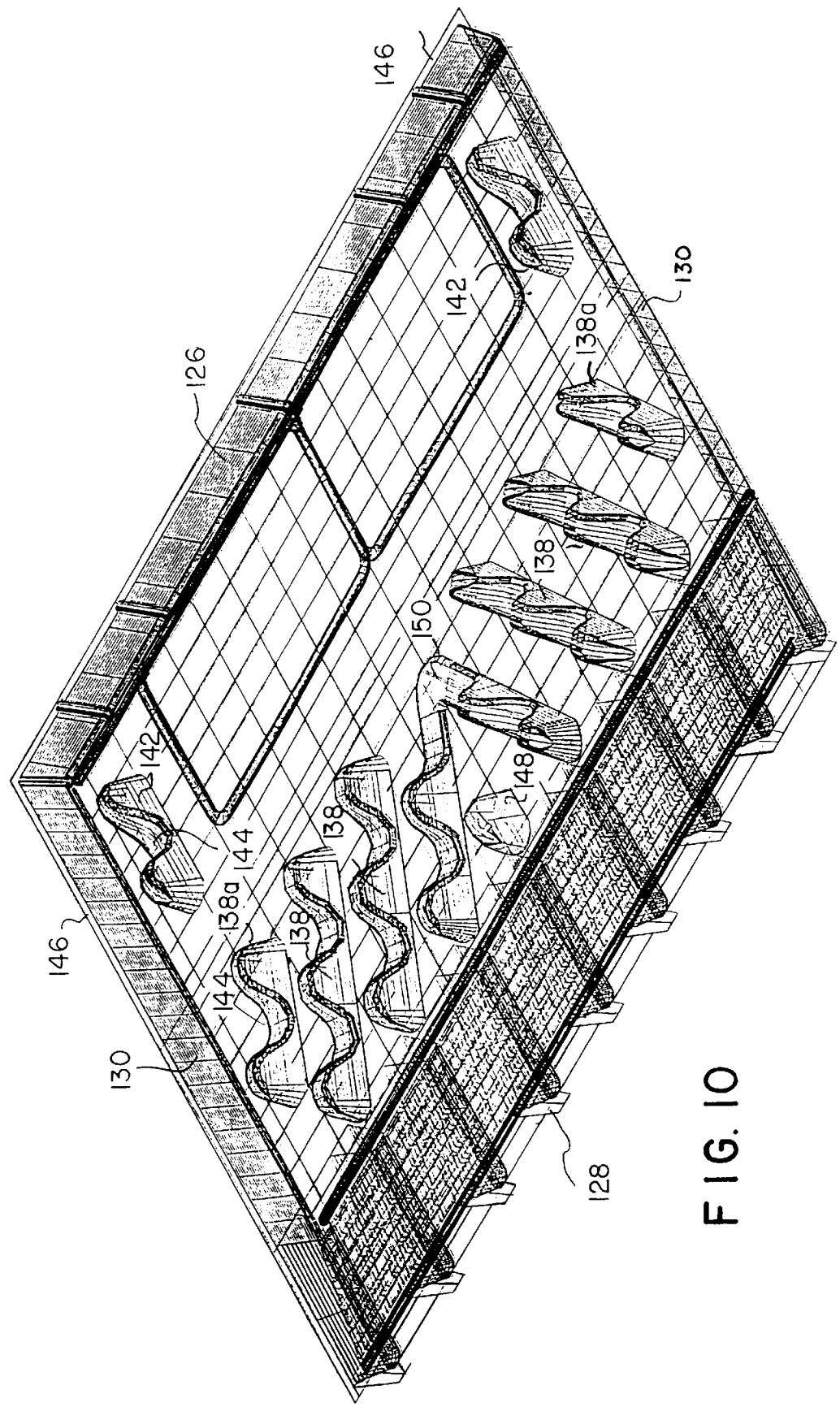
FIG. 10 is a rear perspective view of the bulkhead of FIG. 9.

A preferred embodiment of the invention is illustrated in FIGS. 9 and 10. As is evident from these figures, the rectangular panel 122 is similar to that of the embodiment of FIGS. 4–6 and includes a front wall 124, a top wall 126, a bottom wall 128, and side walls 130 which define an air flow cavity. The front wall includes spaced tapered sections 132 containing openings 134 and defining pallet stops 136. A flange 146 extends from the top, bottom, and side walls.

Figure 5:
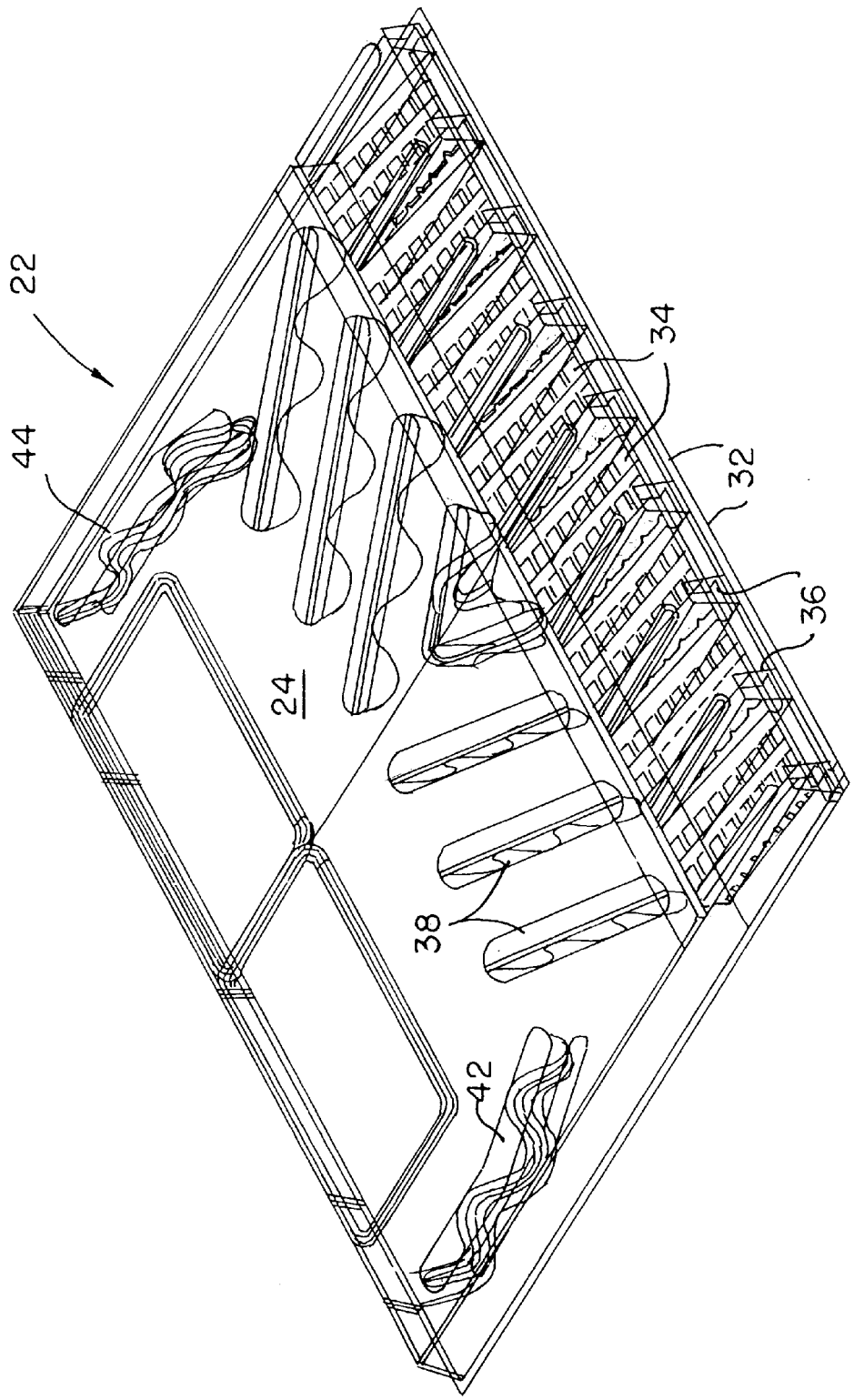

The primary difference in the embodiment of FIGS. 9 and 10 from that of FIGS. 4–6 is in the configuration of the first baffles 138 and the second baffles 142. As best shown in FIG. 9, the lower portion of the baffles 138 are aligned with the pallet stops 136. This arrangement improves the air flow of the bulkhead since air entering the cavity via the openings 134 in the tapered sections 132 passes upwardly and between the baffles 138. The outermost baffles 138a are truncated to allow a space between these baffles and the side walls 130. The second baffles 142 extend parallel to the vertical centerline CL of the panel. The first and second baffles 138 and 142 contain at least one recess 144 as shown in FIG. 10 to allow the passage of air therethrough.

The bulkhead of FIGS. 9 and 10 also includes a truncated third baffle 148 co-linear with the vertical centerline CL which is also aligned with a central pallet stop 136. Where the upper portions of the first baffles on opposite sides of the centerline intersect, the first baffles have a portion 150 of reduced dimension as shown in FIG. 10. This enables air to flow through the intersecting baffles at the center of the bulkhead.

Another difference in the bulkhead of FIGS. 9 and 10 is the provision of a rib 152 extending laterally across the front panel 124 between the upper edges of the pallet stops 136 and the lower portions of the first and third baffles 138, 148. The rib, which may also be provided in the bulkhead of FIGS. 4–6, increases the rigidity and strength of the bulkhead.

One drawback to screwing the panels to the trailer wall is that the panels buckle or separate from the wall owing to expansion or contraction of the plastic material in response to temperature fluctuations. This deformation of the panels destroys the seal around the perimeter of the panel, whereby air flow behind the bulkhead is no longer controlled in the proper fashion.

Figure 14:
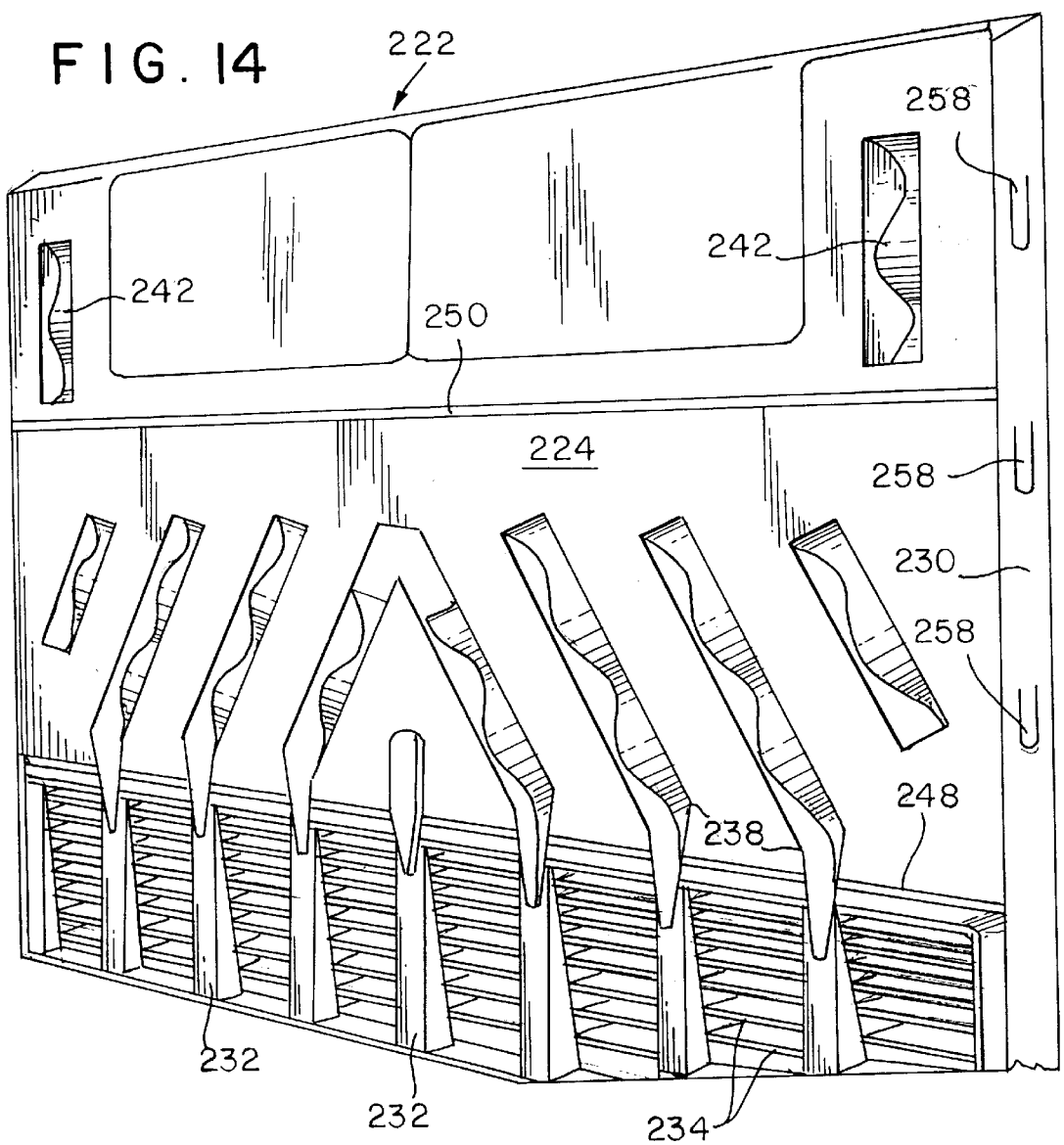
FIG. 14 is a perspective view of an air return bulkhead including vents in the sides thereof.
Figure 15:
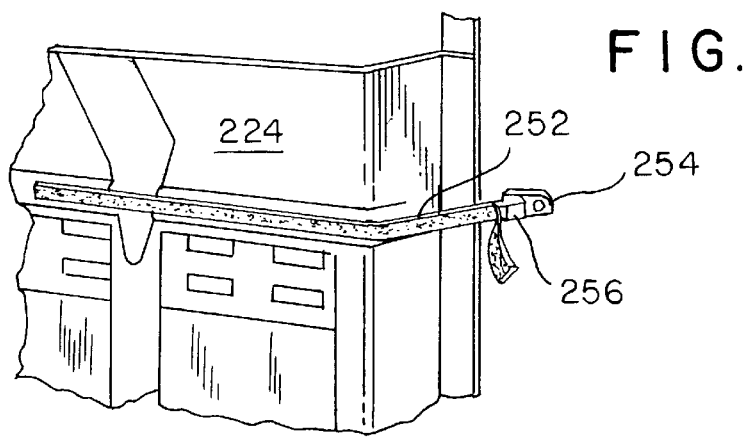
FIG. 15 is a detailed perspective view of the strap mechanism for removably connecting the air return bulkhead to the front wall of a trailer.

In order to overcome this problem, an improved fastening system for the bulkhead is provided which allows for limited movement of the bulkhead relative to the trailer wall. Referring to FIG. 11, the flange 146 extending from the top, bottom, and side walls contains a plurality of slots 154 in the outer edge thereof. A washer 156 is arranged within and above each slot and is adapted to receive a self-tapping screw or rivet 158. Referring to FIGS. 12 and 13, the washer 156 includes an oblong upper portion 156a and a depending shoulder portion 156b through which a rivet-receiving opening 160 passes. The shoulder portion 156b of the washer has a depth greater than the thickness of the flange and an outer diameter less than the width of slow 154. The top oblong portion 156a has a long dimension greater than the width of the slot. Because of the unique configuration of the washer, the bulkhead panel 122 is afforded a limited degree of movement relative to the wall to which it is fastened to accommodate expansion and contraction thereof An alternative fastening system is shown in FIGS. 14 and 15. The panel 222 contains a pair of spaced horizontal channels 248, 250 which extend continuously across the panel front wall 224 between the side walls 230. The lower channel 248 is arranged between the tapered sections 232 and the first baffles 238. The upper channel 250 is arranged below the second baffles 242. The channels 248, 250 are adapted to receive adjustable straps 252 as shown in FIG. 15. The straps pass through loops 254 secured to the front vertical wall of the trailer. A cinching device 256 at one end of each strap (or on the associated loop) is provided for tightening and releasing the straps.

With the alternative fastening system of FIGS. 14 and 15, the bulkhead is quickly and easily mounted on the trailer wall by passing the straps through the loops and channels and then tightening the straps to securely hold the bulkhead in place. In order to remove the bulkhead, the straps are released and the bulkhead falls away from the trailer wall.

Under certain conditions, the air openings 234 in the bottom portion of the panel front panel 224 become blocked, impeding air flow through the bulkhead to the refrigeration unit. For example, the trailer may be improperly loaded with cargo placed against the air intake area, thereby blocking the openings. Also, over time debris such as paper and plastic sheeting from the trailer or trailer cargo is drawn into the openings and clogs the same.

When the air openings at the bottom of the bulkhead are clogged, the temperature distribution throughout the trailer becomes uneven which could damage or spoil the cargo. Accordingly, bypass vents 258 are provided in the upper portions of the side walls 230 as shown in FIG. 14. The vents are normally closed during operation of the refrigeration unit. However, when the air openings 234 are blocked, the pressure in the cavity behind the bulkhead drops below the ambient pressure within the trailer causing the vents to open and allow return air from the trailer to enter the cavity. In the preferred configuration, the vents are integrally formed in the side walls by cutting through the side walls to define a flap which can be deflected into the cavity in response to a pressure drop in the cavity. Alternatively, separate venting members can be formed and attached to the side walls, with openings being cut in the side walls beneath the venting members.

Turning now to FIGS. 16–18, another feature of the air return bulkhead 222 according to the invention will be described. In most refrigeration units 204, the air return intake is at the bottom of the unit and the bulkhead can be fit up to the bottom of the unit to funnel the return air to the unit's air intake. However, some refrigeration units such as the THERMO-KING SUPER II have air intakes 205 on the side which are not normally covered by the bulkhead. In order to accommodate such units, the air return bulkhead of the invention can be provided with spaced vertically extending wings 260 connected with the top wall 226 of the bulkhead panel. Each wing is hollow and contains a portion 262 in the rear thereof which is cut away prior to fitting adjacent to the air intakes 205 of the refrigeration unit 204. The use of the wings 260 achieves two objectives for optimal air flow. First, the bulkhead can be mounted as low as possible in the trailer to take air from the trailer floor. Second, the additional air intakes of the refrigeration unit are covered. If the wings are not used, the only way to achieve these objectives is to make the bulkhead taller which greatly increases its cost.

The wings 260 are preferably formed of synthetic plastic material. At installation, the bulkhead is fastened to the trailer wall adjacent the lower edge of the refrigeration unit, with the top wall of the bulkhead panel being cut away adjacent the unit to allow air from the bulkhead cavity to enter the unit. The wings are trimmed according to the configuration of the unit and then mounted on the bulkhead, snugged up against the refrigeration unit, and fastened to the trailer wall. Only air from the cavity is drawn into the side air intakes 205 of the refrigeration unit via the wings.

While in accordance with the provisions of the patent statute the preferred forms and embodiments of the invention have been illustrated and described, it will be apparent to those of ordinary skill in the art that various changes and modifications may be made without deviating from the inventive concepts set forth above.

What is claimed is:

1. An air return bulkhead adapted for mounting adjacent a refrigeration unit in spaced relation from a front vertical wall of a refrigeration trailer, comprising (a) a generally rectangular panel including a front wall and side, top, and bottom walls extending normal to said front wall to define a cavity behind said front wall;

(b) said panel front wall containing a plurality of openings in the lower portion thereof which enable air to enter said cavity; and (c) a plurality of normally closed vent means arranged in at least one of said walls and operable to allow air to enter said cavity when said openings are at least partially blocked, whereby air from the trailer is normally drawn from the bottom and sides of the trailer and directed to the refrigeration unit by said panel to improve the overall cooling of the trailer and to eliminate hot and cold spots.

2. A bulkhead as defined in claim 1, wherein said vent means are arranged above the lower portion of said panel front wall.

3. A bulkhead as defined in claim 2, wherein said vent means are arranged in said side walls.

4. A bulkhead as defined in claim 1, and wherein said vent means comprise flexible members pivotally connected with said one of said walls, said flexible members being deflected into said cavity to open said vent means when the pressure within said cavity is less than the ambient pressure.

5. A bulkhead as defined in claim 4, wherein said flexible members are integrally connected with said side walls.

6. A bulkhead as defined in claim 5, wherein said panel front wall includes a plurality of spaced tapered sections in the lower portion thereof extending toward the rear of said bottom wall, said tapered sections defining therebetween a plurality of pallet stops coplanar with said front wall, said tapered sections containing said openings.

7. A bulkhead as defined in claim 6, and further comprising
   (a) first angled baffle means extending from a rear surface of said front wall above said openings for directing air upwardly toward an upper central portion of said panel; and
   (b) second baffle means extending from said front wall rear surface above said first baffle means and adjacent to said side walls for directing air laterally toward the upper central portion of said panel.

8. An air return bulkhead adapted for mounting adjacent a refrigeration unit in spaced relation from a front vertical wall of a refrigeration trailer, comprising
   (a) a generally rectangular panel including a front wall and side, top, and bottom walls extending normal to said front wall to define a cavity behind said front wall;
   (b) said panel front wall containing a plurality of openings in the lower portion thereof which enable air to enter said cavity; and
   (c) strap means for releasably connecting said panel with the front wall of the trailer, whereby air from the trailer is normally drawn from the bottom and sides of the trailer and directed to the refrigeration unit by said panel to improve the overall cooling of the trailer and to eliminate hot and cold spots.

9. A bulkhead as defined in claim 8, wherein said front wall contains at least one horizontal channel extending continuously between said side walls for receiving said strap means, said strap means having ends connected with brackets on the trailer front wall.

10. A bulkhead as defined in claim 9, wherein said strap means includes a tension device, whereby said strap means may be tightened to press said panel against the trailer vertical wall and loosened to remove said panel from the trailer front wall.

11. A bulkhead as defined in claim 10, wherein said panel front wall contains a pair of spaced horizontal channels and said strap means comprises a pair of straps arranged in said pair of channels, respectively.

12. A bulkhead as defined in claim 11, wherein said panel front wall includes a plurality of spaced tapered sections in the lower portion thereof extending toward the rear of said bottom wall, said tapered sections defining therebetween a plurality of pallet stops coplanar with said front wall, said tapered sections containing said openings.

13. A bulkhead as defined in claim 12, and further comprising
   (a) first angled baffle means extending from a rear surface of said front wall above said openings for directing air upwardly toward an upper central portion of said panel; and
   (b) second baffle means extending from said front wall rear surface above said first baffle means and adjacent to said side walls for directing air laterally toward the upper central portion of said panel.

14. An air return bulkhead adapted for mounting adjacent a refrigeration unit in spaced relation from a front vertical wall of a refrigeration trailer, comprising
   (a) a generally rectangular panel including a front wall and side, top, and bottom walls extending normal to said front wall to define a cavity behind said front wall;
   (b) said panel front wall containing a plurality of openings in the lower portion thereof which enable air to enter said cavity; and
   (c) a spaced pair of vertically extending wings connected with said top wall and arranged adjacent to openings in the side surfaces of the refrigeration unit for directing air from the upper central portion of said panel to the refrigeration unit openings, whereby air from the trailer is normally drawn from the bottom and sides of the trailer and directed to the refrigeration unit by said panel to improve the overall cooling of the trailer and to eliminate hot and cold spots.

15. A bulkhead as defined in claim 14, wherein said wings are laterally adjustable relative to said panel top wall, whereby said wings can be positioned to accomodate refrigeration units of different sizes.

16. A bulkhead as defined in claim 15, wherein said panel and said wings are formed of synthetic plastic material which can be trimmed to fit against trailer walls and refrigeration units of different dimensions.

17. A bulkhead as defined in claim 16, wherein said panel front wall includes a plurality of spaced tapered sections in the lower portion thereof extending toward the rear of said bottom wall, said tapered sections defining therebetween a plurality of pallet stops coplanar with said front wall, said tapered sections containing said openings.

18. A bulkhead as defined in claim 17, and further comprising
   (a) first angled baffle means extending from a rear surface of said front wall above said openings for directing air upwardly toward an upper central portion of said panel; and
   (b) second baffle means extending from said front wall rear surface above said first baffle means and adjacent to said side walls for directing air laterally toward the upper central portion of said panel.

19. An air return bulkhead adapted for mounting adjacent a refrigeration unit in spaced relation from a front vertical wall of a refrigeration trailer, comprising
   (a) a generally rectangular panel including a front wall and side, top, and bottom walls extending normal to said front wall to define a cavity behind said front wall;
   (b) said panel front wall including a plurality of horizontally spaced tapered sections in the lower portion thereof extending toward the rear of said bottom wall, said tapered sections defining therebetween a plurality of pallet stops coplanar with said front wall, said tapered sections containing a plurality of openings which enable air to enter said cavity;
   (c) first angled baffle means extending from a rear surface of said front wall above said tapered sections for directing air upwardly toward an upper central portion of said panel;
   (d) second baffle means extending from said front wall rear surface above said first baffle means and adjacent to said side walls for directing air laterally toward the upper central portion of said panel;

(e) a plurality of normally closed vent means arranged in at least one of said side walls and operable to allow air to enter said cavity when said openings are at least partially blocked;

(f) strap means for releasably connecting said panel with the front wall of the trailer; and (g) a spaced pair of vertically extending wings connected with said top wall and arranged adjacent to openings in the side edges of the refrigeration unit for directing air from the upper central portion of said panel to the refrigeration unit openings, whereby air from the trailer is normally drawn from the bottom and sides of the trailer and directed to the refrigeration unit by said panel to improve the overall cooling of the trailer and to eliminate hot and cold spots.

* * * * *